United States Patent
Jo et al.

(10) Patent No.: US 11,220,441 B2
(45) Date of Patent: Jan. 11, 2022

(54) PROCESS FOR RECOVERING AMIDE COMPOUNDS

(71) Applicant: LG CHEM, LTD., Seoul (KR)

(72) Inventors: Sanghwan Jo, Daejeon (KR); Joong Jin Han, Daejeon (KR); Hansol Kim, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

(21) Appl. No.: 16/967,085

(22) PCT Filed: Nov. 15, 2019

(86) PCT No.: PCT/KR2019/015679
§ 371 (c)(1),
(2) Date: Aug. 3, 2020

(87) PCT Pub. No.: WO2020/130367
PCT Pub. Date: Jun. 25, 2020

(65) Prior Publication Data
US 2021/0039963 A1   Feb. 11, 2021

(30) Foreign Application Priority Data

Dec. 18, 2018  (KR) .......................... 10-2018-0164128

(51) Int. Cl.
*C02F 1/04* (2006.01)
*C08J 11/02* (2006.01)
*C02F 101/38* (2006.01)

(52) U.S. Cl.
CPC ............ *C02F 1/048* (2013.01); *C08J 11/02* (2013.01); *C02F 2101/38* (2013.01); *C08J 2381/02* (2013.01)

(58) Field of Classification Search
None
See application file for complete search history.

(56) References Cited

U.S. PATENT DOCUMENTS

| 4,415,729 A | 11/1983 | Scoggins et al. |
| 4,524,200 A | 6/1985 | Sherk et al. |
| 2017/0029570 A1* | 2/2017 | Kobayashi ......... C08G 75/0254 |
| 2018/0171079 A1 | 6/2018 | Miyahara et al. |
| 2019/0135982 A1 | 5/2019 | Miyahara et al. |

FOREIGN PATENT DOCUMENTS

| JP | S54-143404 A | 11/1979 |
| JP | S59-001536 A | 1/1984 |
| JP | S59-089327 A | 5/1984 |

(Continued)

OTHER PUBLICATIONS

Sanghwan JO, "Design of heat-integrated distillation column", Submitted to the Graduate School in Partial Fulfillment of the Requirements for the Degree of Master of Chemical Engineering, Applied Chemistry and Biological Engineering Graduate School Chungnam National University, Nov. 2013.

*Primary Examiner* — Derek N Mueller
(74) *Attorney, Agent, or Firm* — Dentons US LLP (57) ABSTRACT

There is provided a method for efficiently recovering amide-based compounds such as N-methyl-2-pyrrolidone from a waste liquid containing amide-based compounds such as N-methyl-2-pyrrolidone generated, for example, in a production process of polyarylene sulfide.

13 Claims, 3 Drawing Sheets

(56) References Cited

FOREIGN PATENT DOCUMENTS

| | | |
|---|---|---|
| JP | 2010083780 A | 4/2010 |
| JP | 2010100701 A | 5/2010 |
| JP | 2012136629 A | 7/2012 |
| JP | 5817560 B2 | 11/2015 |
| JP | 6295379 B2 | 3/2018 |
| KR | 10-2010-0113462 A | 10/2010 |
| KR | 10-2015-0113367 A | 10/2015 |
| WO | 2016-199869 A1 | 12/2016 |

\* cited by examiner

PROCESS FOR RECOVERING AMIDE COMPOUNDS

The present application is a National Phase entry pursuant to 35 U.S.C. § 371 of International Application No. PCT/KR2019/015679 filed on Nov. 15, 2019, and claims priority to and the benefit of Korean Patent Application No. 10-2018-0164128 filed on Dec. 18, 2018 with Korean Intellectual Property Office, the disclosures of which are incorporated herein by reference in their entity.

FIELD

The present invention relates to a method for efficiently recovering amide-based compounds such as N-methyl-2-pyrrolidone from a waste liquid containing amide-based compounds such as N-methyl-2-pyrrolidone generated in a production process of polyarylene sulfide.

BACKGROUND

Polyarylene sulfide (PAS) represented by polyphenylene sulfide (PPS) has excellent strength, heat resistance, flame retardancy and processability, and thus, it is widely used as a material for replacing metals, especially die cast metals such as aluminum and zinc, in automobiles, electrical/electronic products, machinery, etc. In particular, in the case of PPS resin, it is one of Super EP and has good fluidity, and therefore, it is advantageous to use as a compound by kneading with fillers or reinforcing materials such as glass fibers.

In general, a method using an amide-based compound such as N-methyl pyrrolidone (NMP) as a solvent in a PAS polymerization process is widely known industrially. Further, even after the PAS is polymerized, the remaining unreacted materials are removed by washing with the amide-based compound such as N-methyl-2-pyrrolidone (NMP) or water. The amide-based compound such as N-methyl-2-pyrrolidone used in this way is more expensive than ordinary organic solvents, and also, when discharged as an aqueous solution, it is known to be a major cause of environmental pollution, and thus, it is generally recovered, purified and recycled.

However, the amide-based compounds such as N-methyl-2-pyrrolidone are infinitely mixed with water because the higher the solubility of organic materials, the better the compatibility with water. In addition, when a large amount of an inorganic salt such as an effluent from a PAS production process is dissolved, it is difficult to perform distillation as it is, and thus, various recovery methods have been attempted.

For example, unreacted materials remaining after PAS polymerization are removed by washing with NMP or water. At this time, most of the NMP used was recovered through a distillation process. However, in the case of a conventionally known distillation process, the amide-based compound such as N-methyl-2-pyrrolidone has a disadvantage that in order to separate and recover the amide-based compound with high purity, the apparatus cost for increasing the number of theoretical stages in a distillation column is high and energy consumption is large. In addition, when an inorganic salt such as effluent from a PAS production process is dissolved, many amide-based compounds must be left in order to ensure fluidity in the distillation column, and thus, there is a disadvantage in that loss of residual components is large and processing costs are increased. In order to overcome the disadvantages of the distillation process, an attempt was conducted to develop an extraction process or a membrane process, but inorganic salts contained as impurities in an extraction solvent are mixed and additionally extracted with water. During this process, amide-based compounds may be reversely extracted, and the separation efficiency and performance have not been good yet, and thus, the related technology has expired or been abandoned, and has not been widely used.

Therefore, there is a continuing need to develop a process for recovering amide-based compounds capable of minimizing the energy consumption of the entire process, reducing the initial cost of the apparatus, and more efficiently separating high purity compounds.

An object of the present invention is to provide a method for recovering amide-based compounds which can efficiently recover amide-based compounds such as N-methyl-2-pyrrolidone from a waste liquid containing amide-based compounds such as N-methyl-2-pyrrolidone generated in a production process of a polyarylene sulfide, by using a method of circulating thermal energy generated in a distillation process of treating a waste liquid, thereby reducing energy consumption of the entire process.

In accordance with one aspect of the present invention, there is provided a method for recovering amide-based compounds including:

collecting a waste liquid containing water and amide-based compounds into a storage tank;

distilling the waste liquid from a stripping section, separating a vapor phase mixture containing water and amide-based compounds which is vaporized at an upper part of the stripping section, and separating a liquid mixture containing amide-based compounds which is not vaporized at a lower part of the stripping section;

conducting distillation by transferring the vaporized vapor phase mixture containing water and amide-based compounds separated from the upper part of the stripping section to a rectifying section;

circulating heat generated in the distillation process of the stripping section and the rectifying section using a heat exchanger;

recirculating the vaporized vapor phase mixture containing water and amide-based compounds in the rectifying section, flowing out the vaporized water to an upper part of the rectifying section, and flowing out the amide compound liquefied by recirculation to a lower part of the rectifying section and then recycling to the stripping section; and flowing out the liquid phase mixture containing amide-based compounds from the stripping section to the lower part of the stripping section.

DETAILED DESCRIPTION

Hereinafter, a method for recovering amide-based compounds from, for example, a waste liquid generated in a production process of a polyarylene sulfide, according to specific embodiments of the present invention, will be described in more detail.

Terms such as first, second, and the like may be used to describe various components, and the terms are used only to discriminate one constituent element from another component.

Further, the terms used herein are used only to describe specific exemplary examples, and are not intended to limit the present invention. A singular expression includes a plural expression unless clearly meaning otherwise. It should be understood that the terms "comprise", "include", and "have" as used herein are intended to designate the presence of stated features, numbers, steps, constitutional elements, or combinations thereof, but it should be understood that they do not preclude the possibility of existence or addition of one or more other features, numbers, steps, constitutional elements, or combinations thereof.

Since a variety of modifications may be made to the present invention and there may be various forms of the present invention, specific examples are illustrated and will be described in detail below. However, it should be understood that this is not intended to limit the present invention to particular forms disclosed herein, and the invention compasses all modifications, equivalents, or alternatives falling within the spirit and technical scope of the present invention.

Hereinafter, the present invention will be described in more detail step-by-step.

According to one embodiment of the invention, there is provided a method for recovering amide-based compounds including:

a first step of collecting a waste liquid containing water and amide-based compounds generated, for example, in a production process of polyarylene sulfide, into a storage tank;

a second step of distilling the waste liquid from a stripping section, separating a vapor phase mixture containing water and amide-based compounds which is vaporized at the upper part of the stripping section, and separating a liquid phase mixture containing amide-based compounds which is not vaporized at the lower part of the stripping section;

a third step of conducting distillation by transferring the vaporized vapor phase mixture containing water and amide-based compounds separated from the upper part of the stripping section to a rectifying section;

a fourth step of circulating heat generated in the distillation process of the stripping section and the rectifying section using a heat exchanger;

a fifth step of recirculating the vaporized vapor phase mixture containing water and amide-based compounds in the rectifying section, flowing out the vaporized water to the upper part of the rectifying section, and flowing out the amide compound liquefied by recirculation to the lower part of the rectifying section and then recycling to the stripping section; and a sixth step of flowing out the liquid phase mixture containing amide-based compounds from the stripping section to the lower part of the stripping section.

The present invention provides a method and apparatus for efficiently recovering amide-based compounds such as N-methyl-2-pyrrolidone from an aqueous solution containing amide-based compounds such as N-methyl-2-pyrrolidone.

In particular, the present invention can provide a method in which in order to efficiently separate high purity amide-based compounds from waste liquids containing various inorganic salts and impurities generated from the production process of polyarylene sulfide (PAS), heat generated in the stripping section and the rectifying section can be exchanged by using a distillation process and a heat exchanger at the same time, even without using an extraction process, thereby minimizing the energy consumption of the entire process and reducing the initial apparatus cost compared to before while improving the separation efficiency and performance.

Figure 1:
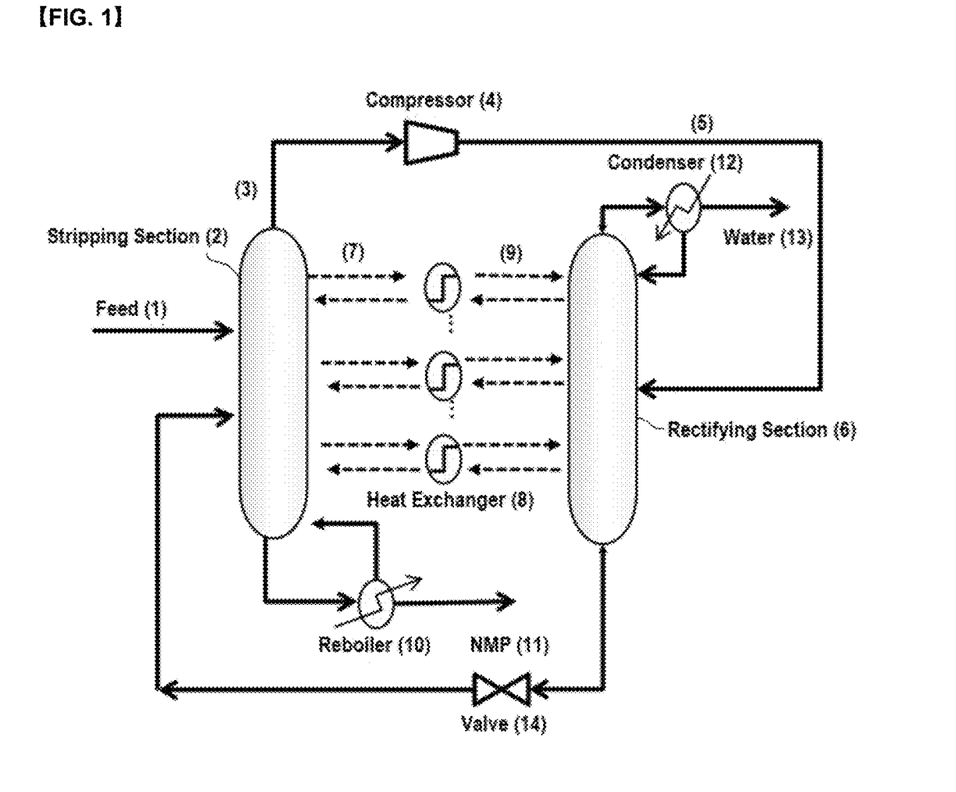
FIG. 1 is a schematic diagram showing a process and apparatus for recovering amide-based compounds from a waste liquid generated in the polyarylene sulfide polymerization process according to an embodiment of the present invention.

Specifically, the method for recovering the amide-based compound can be performed according to the method as shown in FIG. 1.

As shown in FIG. 1, the method of the present invention can collect the waste liquid generated in the production process of polyarylene sulfide, and then is passed through a stripping section 2, a rectifying section 6, and at least one heat exchanger 8 located between the stripping section and the rectifying section, thereby effectively recovering amide-based compounds from the waste liquid. In this case, FIG. 1 is merely exemplary, and the scope of the process and apparatus for recovering the amide compound depending on the installation position and the number of the heat exchangers are not limited to the accompanying drawings.

The method can be performed by introducing the energy of the rectifying section into a heat-integrated distillation column (HIDic) through each stage of the stripping section.

In particular, the method can simplify the design process by heat integration of only selected stages without heat integration of all stages of the distillation column.

At least one type of the heat exchanger may be connected and installed between the stripping section and the rectifying section.

In one embodiment of the invention, the first step is a step of collecting a waste liquid containing water and amide-based compounds generated in the production process of polyarylene sulfide into a storage tank.

The production process of polyarylene sulfide may be performed according to a method well known in the art, and after the polymerization of the polyarylene sulfide is completed, a washing process may be performed to collect a waste liquid.

At this time, the waste liquid of the first step is preferably a liquid from which fine powders of inorganic salt and polyarylene sulfide are removed from a reaction mixture in the production process of polyarylene sulfide via a pretreatment process using a filtration means. In addition, the filtration can be performed in accordance with a method well known in the art, and thus, the method is not limited. For example, the waste liquid of the first step may be collected by filtering the reaction mixture generated in the production process of polyarylene sulfide to remove fine powders such as NaCl and PPS.

For example, in the production process of polyarylene sulfide (PAS), the composition of the waste liquid after washing includes about 20% by weight to about 70% by weight, or about 30% by weight to about 60% by weight of an amide compound such as NMP, and the composition of the brine containing sodium chloride (NaCl) may include about 30% to about 80% by weight, or about 40% to about 70% by weight. Moreover, the waste liquid may further include other impurities, including p-DCB, NaSH, $Na_2S$ and dispersed PPS fine particles, within about 10% by weight, or within about 5% by weight relative to the total weight of the solution medium. Other impurities include 2-pyrrolidinone, 1-methyl-2,5-pyrrolidinone and 3-chloro-N-methylaniline, which may be one or more of them. A waste liquid containing water and amide-based compounds is subjected to a pretreatment process such as filtration to remove a fine powder such as NaCl and PPS, and collected in a storage tank.

The second step is a step of distilling the waste liquid from a stripping section, separating a vapor phase mixture containing water and amide-based compounds which is vaporized at the upper part of the stripping section, and separating a liquid phase mixture containing amide-based compounds which is not vaporized at the lower part of the stripping section.

After the raw material waste liquid is supplied to the stripping section, separation may be performed into the liquid and vapor from the waste liquid through distillation. Thereafter, the waste liquid raw material may flow down to the bottom of the distillation column in the stripping section and flow into a reboiler. The waste liquid mixture vaporized at the top of the distillation column may be discharged and then flow into the rectifying section through a compressor.

Further, the stripping section may include a distillation column consisting of a plurality of stages. Further, the waste liquid may be supplied as a raw material at a constant flow rate to the distillation column of the stripping section.

When fractional distillation proceeds after the raw material waste liquid 1 is supplied to the stripping section, water and some amide-based compounds are moved to the upper part of the stripping section, and some water and amide-based compounds may be moved to the lower part of the stripping section. The mixture of the liquid phase mixture moved to the lower side stage of the stripping section may be moved to the bottom of the distillation column in the stripping section, and then flow into a reboiler 10. In particular, in the stripping section, distillation is performed via heat transferred from the heat exchanger and the reboiler. According to this process, the amide-based compound and the aqueous medium can be separated, passed through the reboiler and expelled to the outside.

The third step is a step of boosting the vaporized vapor phase mixture containing water and amide-based compounds separated at the upper part of the stripping section through the compressor and transferring it to a rectifying section. In this step, the pressure is increased to a pressure equivalent to two to three times the pressure to be introduced, and then moved to the rectifying section.

Further, the fourth step is a step of transferring heat of the rectifying section to the stripping section using a heat exchanger, thereby reducing the energy of the condenser in the rectifying section, reducing the energy of the reboiler in the stripping section, and proceeding with the distillation process. This makes it possible to reduce a load on the condenser through the role of recirculating the fluid returning from a heat exchanger in the rectifying section, and to reduce a load on the reboiler by returning a liquid to a gas in the stripping section.

The fifth step is a step of recirculating the vaporized vapor phase mixture containing water and amide-based compounds in the rectifying section, sending the vaporized water to the upper part of the rectifying section, and sending the amide compound liquefied by recirculation to the lower part of the rectifying section and then recycling to the stripping section.

After performing the distillation of the waste liquid in the stripping section, the mixture of water and amide-based compounds contained in the waste liquid is vaporized, and thus, these vaporized water and amide-based compounds are transmitted to the rectifying section via a compressor. Thereafter, recirculation is carried out through distillation in the rectifying section. The vapor in the vapor phase mixture of vaporized water and amide-based compounds may be sent to the upper part of the rectifying section and then recovered via a condenser.

In this case, the recirculation ratio in the condenser may be about 0.05 to 0.1 mole.

Moreover, some of the vaporized amide-based compounds may be liquefied and discharged to the lower part of the rectifying section. The liquid phase amide-based compound discharged in this way may be recycled to the stripping section.

Specifically, in the rectifying section of the third step, the recirculation may flow on the lower side of the rectifying section, and non-recirculated vaporized water can be separated after being condensed via a condenser and collected in another water storage tank where a constant liquid level is maintained.

Further, in the fourth step, heat generated in the distillation process of the stripping section and the rectifying section is circulated. This process allows gas to enter the heat exchanger from the rectifying section and vaporizes the liquid entering from the stripping section, and the liquid returning after transferring energy can serve to increase the recirculation.

According to a preferred embodiment, the vapor flowing into the rectifying section can be moved to a heat exchanger which is connected between stripping sections via a line. In the heat exchanger, the liquid phase flowing in from the stripping section via the line moves. Thus, the vapor of the rectifying section and the liquid phase stream of the stripping section are met by a heat exchanger, so that heat transfer can be performed.

Between the stripping section and the rectifying section, one or more heat exchangers for circulating the heat energy of the stripping section and the rectifying section is connected, and the heat transfer can take place.

In particular, by repeating such a process one or more times, the present invention can save the energy of the reboiler.

Meanwhile, the sixth step is a step of allowing the liquid phase mixture containing amide-based compounds flown out from the stripping section to flow out to the lower part of the stripping section.

Thereby, 99% or more of the amide-based compound can be recovered from the waste liquid, and also the energy consumption can be reduced.

Meanwhile, FIG. 1 is a schematic diagram exemplarily showing a process and apparatus for recovering amide-based compounds from a waste liquid generated in the polyarylene sulfide polymerization process according to an embodiment of the present invention.

Referring to FIG. 1, the supplied waste liquid is drawn into the stripping section 2 through the feed line 1 and the distillation is performed.

At this time, the vapor passing through a compressor 4 increases the pressure and at the same time the temperature rises. The heat transfer is carried out as much as the elevated temperature. Line 5 refers to a line for transferring the overhead stream of the stripping section that has passed through the compressor to the rectifying section.

Further, the vapor entering the rectifying section 6 meets the liquid coming in from the stripping section 2 via a line 7 in the heat exchanger 8 via a line 9 to transfer heat, and the energy of the reboiler 10 can be saved as much as the heat transferred.

At this time, the number of the heat exchanger 8 and the position of the connected stages should be designed so that the heat transfer amount and the separation efficiency is most optimized.

Preferably, the number of heat exchangers can be chosen as one to three, by optimizing a heat transfer area, a heat exchange flow rate, and a ratio of a flow rate of heat exchange to a flow rate inside the column. Further, the heat exchanger may be located between the $2^{nd}$ stage and the 7th stage or the $2^{nd}$ stage and the 6th stage of the distillation column forming the stripping section, based on the overhead of the distillation column of the rectifying section. For example, one or more or one to three heat exchangers may be installed at predetermined intervals so as to be located between 3, 4, 5 theoretical stage numbers of the stripping section and 3, 4, 5 theoretical stage numbers of the rectifying section.

If the position of the heat exchanger is not installed in the above-mentioned position, optimization of the heat transfer amount cannot be achieved, and there is a problem that energy saving efficiency is reduced.

The water 13 separated in the rectifying section 6 is discharged via a condenser 12, and the amide-based compound is combined with a feed 1 via a valve 14 and recycled. Even in the stripping section 2, distillation is performed through heat transferred from the reboiler 10 and the heat exchanger 8, and the amide-based compound (preferably, NMP) 11 is flown out to the lower part of the stripping section.

Further, in order to flow the amide-based compound in the column top region and the column bottom region as described above from the above-described waste liquid containing water and the amide-based compound, the temperature and pressure conditions inside the distillation column of the stripping section and the distillation section can be controlled.

Further, from the waste liquid containing water and amide-based compounds as described above, in order to allow the amide-based compound to flow in the column top region and the column bottom region, the temperature and pressure conditions inside the distillation column of the stripping section and the distillation section can be controlled.

The temperature of the top region of the distillation column in the stripping section may be adjusted to about 90° C. to 110° C., or about 95° C. to about 105° C., or 99° C. to 101° C. Further, the temperature of the bottom region of the distillation column in the stripping section may be adjusted to about 170° C. to 190° C., or about 175° C. to about 185° C., or 181° C. to 183° C.

The temperature of the top region of the distillation column of the rectifying section may be adjusted to about 125° C. to 145° C., or about 130° C. to about 140° C., or 133° C. to 135° C. Further, the temperature of the bottom region of the distillation column in the rectifying section may be adjusted to about 125° C. to 145° C., or about 130° C. to about 140° C., or 134° C. to 135° C.

The distillation column of the stripping section and the rectifying section may be provided with a temperature adjusting means so as to satisfy the temperature range. The temperature of the column top and bottom regions of the stripping section and the rectifying section are adjusted to the above conditions, and thereby, the amide-based compound can be efficiently recovered from a waste liquid containing water and amide-based compounds without energy consumption.

In addition, each of the distillation processes may be performed under atmospheric pressure conditions.

Meanwhile, according to another embodiment of the invention, there is provided an apparatus for recovering an amide-based compound that can be used in the method as described above.

The apparatus for recovering amide-based compounds may include a distillation column of the stripping section for distilling the waste liquid generated in the production process of polyarylene sulfide, a rectifying section for distilling a vapor phase mixture containing water and amide-based compounds which is vaporized through the stripping section, and one or more heat exchangers located between the stripping section and the rectifying section.

Specific types of the distillation column of the stripping section and the rectifying section which can be used in the process of recovering the amide-based compound are not particularly limited.

For example, the stripping section and the rectifying section use a distillation column of a general structure. In consideration of the purification efficiency, it is also possible to design and use so that the stage numbers of the rectifying section and the stripping section are different.

According to a preferred embodiment, the method can be carried out using a stripping section including a reboiler, a rectifying section including a condenser, and a compressor.

Further, the stage number and inner diameter of the distillation column of the stripping section and the rectifying section are not particularly limited, and for example, it may be set based on the theoretical stage number derived from a distillation curve in consideration of the composition of the waste liquid to be purified.

In one embodiment of the invention, the stripping section may perform a distillation process in such a manner that the theoretical stage number of the distillation column is the 5th sage to the 10th stage or the 7th stage to the 9th stage. Further, the rectifying section may perform a distillation process so that the theoretical stage number of the distillation column is the 6th stage to the 10th stage or the 6th stage to the 8th stage. Here, "theoretical stage number" means the number of virtual regions or stages in which two phases such as vapor phase and liquid phase are in equilibrium with each other in the distillation column.

The distillation column of the stripping section includes a supply port into which a waste liquid containing water and amide-based compounds is introduced. Further, the supply port can be connected to a waste liquid tank containing the waste liquid so that the waste liquid flows therein.

The supply port into which the waste liquid is introduced may be located within 50%, or 10% to 30%, of the theoretical stage number calculated based on the top of the distillation column of the stripping section.

Further, the distillation column of the rectifying section 6 may be provided with a feed port through which the vapor phase mixture including the vaporized water and the amide compound is introduced through the stripping section. The supply port may be located within 50%, or 10% to 30%, of the theoretical stage number calculated based on the top of the distillation column in the distillation section.

Further, the vapor phase mixture may be introduced into the rectifying section through a compressor 4.

In the stripping section, the compressor may be connected and installed to the upper part and the reboiler is connected and installed to the lower part.

Further, the rectifying section may be provided with a condenser for condensing water vapor phase to the upper part, and the lower part may be connected and installed to a line for transferring the amide-based compound produced into the liquid phase through distillation in the rectifying section to the stripping section.

Meanwhile, the apparatus for recovering the amide-based compound may further include a compressor, a condenser, a reboiler, and the like.

The "compressor" is a device installed separately from the distillation column, and any device well-known in the art that serves to compress the vapor phase mixture may be used. For example, as described above, it may mean a device for boosting and compressing a vapor phase mixture including vaporized water and amide-based compound separated in a stripping section. The "condenser" is a device installed separately from the distillation column, and it may mean a device for cooling the material flowing out of the main body in such a manner as to contact with a cooling water introduced from the outside. For example, in the apparatus for recovering the amide-based compound illustrated in FIG. 1, the condenser 12 may be a device for condensing the overhead stream flowing out of the overhead region of the rectifying section. Further, the "reboiler" is a heating device installed outside which is connected to circulate to the bottom of the stripping section 2, and it can mean a device for heating and evaporating the high boiling point flow again. In other words, the reboiler serves to produce the vapor and return it to the column bottom. For example, in the apparatus for recovering the amide-based compound as illustrated in FIG. 1, the reboiler 10 may be a device for heating the bottom stream flowing out of the bottom region of the distillation column of the stripping section 2.

Meanwhile, the present invention efficiently separates an amide-based compound such as N-methyl-2-pyrrolidone from a waste liquid containing various inorganic salts and impurities generated from the production process of polyarylene sulfide (PAS). Thereby, the waste liquid may further include one or more selected from the group consisting of alkali metal alkali metal hydrosulfide, alkali metal sulfide, dihalogenated aromatic compounds of alkali metals, and polyarylene sulfide together with water and amide-based compounds. Specifically, the mixed liquid may further include one or more selected from the group consisting of sodium chloride (NaCl), o-dichlorobenzene (o-DCB), m-dichlorobenzene (m-DCB), p-dichlorobenzene (p-DCB), sodium hydrogen sulfide (NaSH), sodium sulfide ($Na_2S$), and polyphenylene sulfide (PPS) together with water and an amide compound.

As an example, the composition of the waste liquid after washing in a production process of polyarylene sulfide (PAS) may be about 20% to about 70% by weight, or about 30% to about 60% by weight, of an amide compound such as NMP, as described above. The composition of brine containing sodium chloride (NaCl) may include about 30% to about 80% by weight, or about 40% to about 70% by weight. Further, the waste liquid may further include other impurities, including p-DCB, NaSH, $Na_2S$ and dispersed PPS fine particles, in an amount up to about 10% by weight, or up to about 5% by weight, relative to the total weight of the solution medium. Other impurities include 2-pyrrolidinone, 1-methyl-2,5-pyrrolidinone and 3-chloro-N-methylaniline and the like, which may be one or more of them.

Here, specific examples of the amide-based compound include amide compounds such as N,N-dimethylformamide or N,N-dimethylacetamide; pyrrolidone compounds such as N-methyl-2-pyrrolidone (NMP) or N-cyclohexyl-2-pyrrolidone; caprolactam compounds such as N-methyl-ε-caprolactam; imidazolidinone compounds, such as 1,3-dialkyl-2-imidazolidinone; urea compounds such as tetramethyl urea; or phosphoric acid amide compounds, such as hexamethyl phosphate triamide, etc., one or more of which can be used.

For the specific production method of polyarylene sulfide and the specific separation and recovery method of the amide compound, please refer to Examples described below. However, the specific production method of polyarylene sulfide and the specific separation and recovery method of the amide compound are not limited to the contents described herein. The production method and the separation and recovery method may further employ the steps usually employed in the art to which the present invention pertains. The step(s) of the production method and the separation and recovery method may be changed by conventionally changeable step(s).

As described above, according to the present invention, one or more heat exchangers are installed at a predetermined position between the stripping section and the rectifying section, and thereby, the separation efficiency and performance of amide-based compounds such as N-methyl-2-pyrrolidone can be improved from the waste liquid generated in the production process of polyarylene sulfide, and high purity amide-based compounds can be recovered.

In particular, the present invention allows the energy of the rectifying section to circulate to each stage of the stripping section, whereby the stripping section and the rectifying section is capable of heat integration. Therefore, the energy consumption required for recovering amide-based compounds such as NMP can be reduced through the heat transfer of the gas generated in the rectifying section and the liquid of the stripping section. In addition, the method does not heat integrate all the stages of each distillation column, but heat integrates only selected stages, thereby simplifying the design process. Thus, the present invention can minimize the energy consumption of the overall process and reduce initial costs of the apparatus.

Hereinafter, preferred examples are provided to assist the understanding of the present invention. However, the following examples are presented for illustrative purposes only, and the scope of the present invention is not limited thereto.

EXAMPLES

<Production of Polyphenylene Sulfide>

Preparation Example 1

To make a PPS polymer, 70% sodium hydrogen sulfide (NaSH) and sodium hydroxide (NaOH) were mixed in a ratio of 1:1.05 to prepare sodium sulfide. At this time, 0.33 equivalents of sodium acetate ($CH_3COONa$) powder, 1.65 equivalents of N-methyl-2-pyrrolidone (NMP), and 4.72 equivalents of deionized water (DI water) were added to a reactor. Here, the equivalent means a molar equivalent (eq/mol). At this time, a solid reagent was first added, and then NMP and DI water were added in this order. The reactor was then stirred at about 150 rpm and heated to about 215° C. to dehydrate. Then, 1.04 times more equivalent of para-dichlorobenzene (p-DCB) than sodium hydrogen sulfide, and 1.65 equivalents of N-methyl-2-pyrrolidone (NMP) was added to the reactor. Thereafter, the reaction mixture was subjected to a first-stage polymerization at 230° C. for 3 hours, and to a second-stage polymerization reaction at 260° C. for 1 hour, and then distilled water was added and stirred to obtain a PPS polymer.

After completion of the polymerization process, in order to remove residual unreacted materials or by-products, the reaction product was rinsed once with DI water and NMP at about 90° C., and then filtered. Such washing and filtration processes were further repeated two times, and linear polyphenylene sulfide (PPS) as a final product, and an aqueous medium containing NMP as a waste liquid after washing were recovered.

At this time, the waste liquid after washing contained brine (NaCl aqueous solution) which is an aqueous medium containing NMP. Here, the amount of NMP was 5 to 40% by weight, the amount of brine containing NaCl was 1 to 15% by weight, and the amount of water was 20 to 95% by weight. In addition, the waste liquid contained about 10% by weight of other impurities including fine particles such as p-DCB, NaSH, $Na_2S$, PPS fine powder, and 2-pyrrolidinone based on the total weight of the solvent of NMP and brine.

<Separation and Recovery of N-methyl-2-pyrrolidone>

Example 1

The waste liquid obtained from the washing step after the PPS polymerization of Preparation Example 1 was subjected to a pretreatment process such as a filtration to remove fine powders such as NaCl and PPS. And, a mixed liquid having a composition containing 20% by weight of NMP and 80% by weight of water was introduced into a heat integrated distillation column as shown in FIG. 1 to perform the process of separating, purifying and recovering N-methyl-2-pyrrolidone (NMP).

At this time, the stripping section was subjected to a distillation process under atmospheric pressure conditions in the distillation region of the distillation column in which a theoretical stage number was 8 stages. The operating temperature of the top region of the distillation column in the stripping section was adjusted to be about 101° C., and the operating temperature of the column bottom region was adjusted to about 183° C.

Further, the rectifying section was subjected to a distillation process under a pressure condition of 3 atm, which is the discharge pressure of the compressor 4 in the distillation region of the distillation column where theoretical stage number was 7 stages. The operating temperature of the top region of the distillation column in the rectifying section was adjusted to be about 134° C., and the operating temperature of the column bottom region was adjusted to about 134.5° C. The recirculation ratio of the top region of the distillation column was set to about 0.05 mole.

Three heat exchangers were installed at predetermined intervals so as to be located between the theoretical stage number of 3, 4 and 5 stages in the stripping section and the theoretical stage number of 3, 4 and 5 stages in the rectifying section.

Through the above process, it was confirmed that the NMP recovered from the waste liquid was 99.9 wt % or more pure (99.9%) NMP based on the total components.

Each stream condition of Example 1 is summarized in Table 1 below.

TABLE 1

|  | Stream condition | | | | | |
| --- | --- | --- | --- | --- | --- | --- |
|  | 1 | 3 | 5 | 11 | 13 | 14 |
| NMP (%) | 20 | 0.7834 | 0.7834 | 99.2861 | >0.001 | 3.8588 |
| Water (%) | 80 | 99.2166 | 99.2166 | 0.7139 | 99.999 | 96.1412 |
| Total flow rate (kg/hr) | 700 | 701.305 | 701.305 | 141 | 559 | 142.305 |
| Temperature(° C.) | 25 | 100.907 | 256.436 | 182.575 | 134.045 | 134.273 |
| Pressure(bar) | 1.01325 | 1.01325 | 3.03975 | 1.013 | 3.04 | 3.039 |

Comparative Example 1

Figure 2:
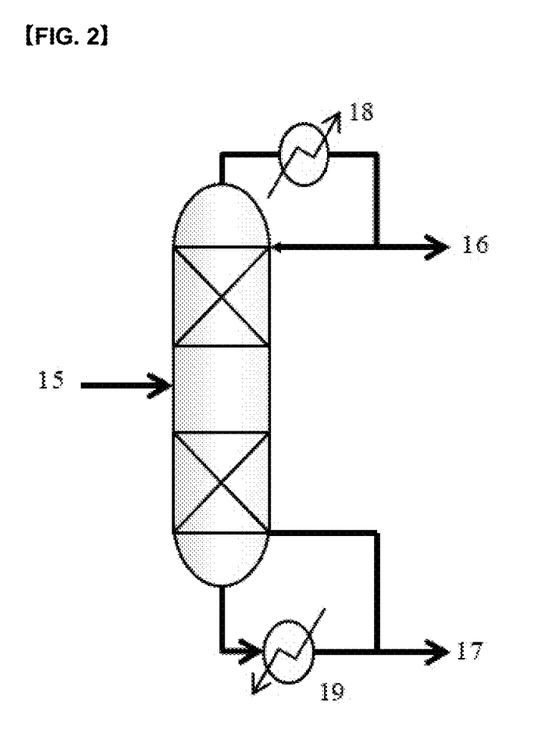
FIG. 2 is a schematic diagram showing a process of recovering amide-based compounds using a conventional distillation process according to Comparative Example 1.

Waste liquid obtained from the washing process after PPS polymerization of Preparation Example 1 was subjected to a pretreatment such as a filtration to remove fine powders such as NaCl and PPS, and a mixed liquid having a composition containing 20% by weight of NMP and 20% by weight of water was subjected to a separation and recovery process of N-methyl-2-pyrrolidone (NMP) using a conventional distillation column as shown in FIG. 2.

First, the mixed liquid containing water and NMP (mixed liquid input stream 15 of FIG. 2) was flown into a mixed liquid supply port located at 8 stages of a conventional distillation column whose theoretical stage numbers were 15 stages at a flow rate of 700 kg/hr without a separate extraction solvent, and separation process was performed. At this time, the distillation process was carried out under the conditions of a column top temperature of 100.02° C. and a column bottom temperature of 176.38° C.

It was confirmed that the content of NMP in the column top stream (in FIG. 2, overhead stream 16 via condenser 18) was 1% by weight or less based on the total components included in the column top stream, and the content of NMP in the column bottom stream (in FIG. 2, stream 17 after reboiler 19) was 98% by weight or more based on the total components included in the column bottom stream.

Each stream condition of Comparative Example 1 is summarized in Table 2 below.

TABLE 2

|  | Stream condition | | |
| --- | --- | --- | --- |
|  | 15 | 16 | 17 |
| NMP (%) | 20 | >1 | 99 |
| Water (%) | 80 | 99 | >1 |
| Total flow rate (kg/hr) | 700 | 558.6 | 141.4 |
| Temperature(° C.) | 25 | 100 | 176.4 |

Comparative Example 2

Figure 3:
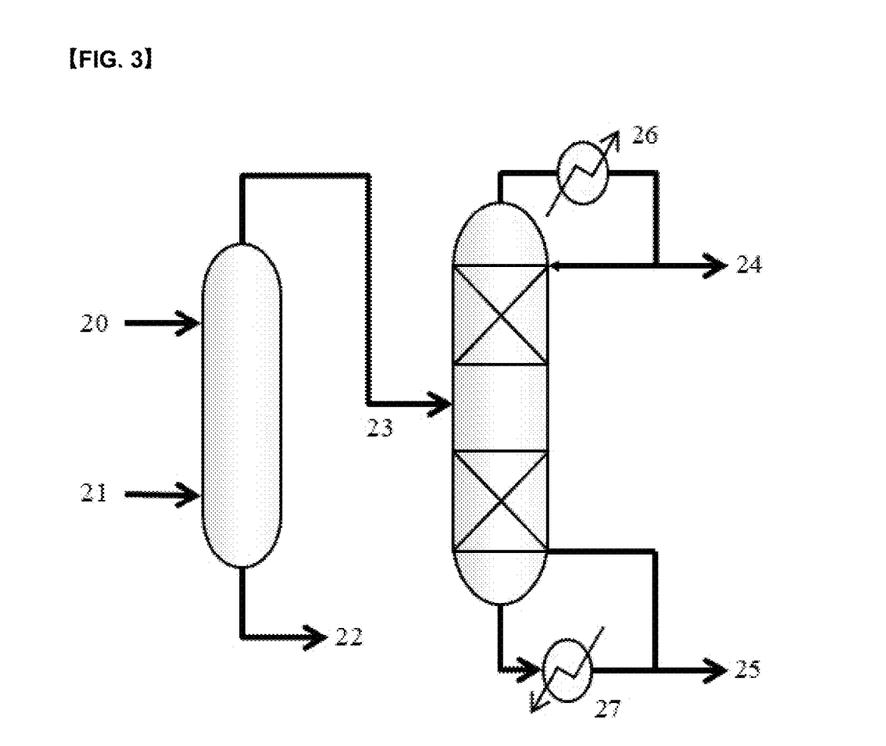
FIG. 3 is a schematic diagram showing a process of recovering amide-based compounds using a conventional extraction process according to Comparative Example 2.

Waste liquid obtained from the washing process after PPS polymerization of Preparation Example 1 was subjected to a pretreatment such as a filtration to remove fine powders such as NaCl and PPS, and a mixed liquid having a composition containing 20% by weight of NMP and 20% by weight of water was subjected to an extraction process by adding an extraction solvent as shown in FIG. 3, and then a separate purification and recovery process of N-methyl-2-pyrrolidone (NMP) was performed using a separate distillation device.

First, the mixed liquid containing water and NMP (mixed liquid input stream 20 of FIG. 3) and chloroform (extraction solvent input stream 21 of FIG. 3) as an extraction solvent were added together to an extraction column, and the extraction process was carried out at about 25° C. under atmospheric pressure conditions. At this time, the extraction solvent was added in an amount of 185 parts by weight based on 100 parts by weight of the total weight of the mixed liquid. The liquid/liquid separation was completed through such extraction process, and an extract liquid containing NMP, water, and an extraction solvent flowing out to the top of the extraction column (stream 23 of FIG. 3) was flown into an extract liquid supply port located at the 8th stage of the existing distillation column whose theoretical stage numbers were 15 stages at a total flow rate of 1439 kg/hr, and an additional distillation process was performed. At this time, the distillation process was performed at about 203° C. under atmospheric pressure.

Meanwhile, an effluent (stream 22 of FIG. 3) containing 99% by weight or more of water was discharged to the column bottom in the extraction process. NMP, extraction solvent and water introduced into the distillation column were separated in the distillation column, and at least 99% of the extraction solvent was discharged into the top stream of the distillation column (in FIG. 3, column top stream 24 via condenser 26) and recycled to the extraction step. A pure NMP was discharged to the stream below the distillation column (in FIG. 3, column bottom stream 25 through reboiler 27) at a concentration of 99%.

Each stream condition of Comparative Example 2 is summarized in Table 3 below.

TABLE 3

| | Stream condition | | | | | |
|---|---|---|---|---|---|---|
| | 20 | 21 | 22 | 23 | 24 | 25 |
| NMP (%) | 20 | — | >1 | 9.7 | >0.1 | 99.8 |
| Water (%) | 80 | — | 99 | 0.3 | 0.3 | >0.1 |
| Extraction solvent(%) | — | 100 | >1 | 90 | 99.7 | 0.2 |
| Total flow rate) | 700 | 1300 | 561 | 1439 | 1299 | 140 |
| Temperature (° C.) | 25 | 25 | 23.53 | 23.47 | 54.91 | 203.63 |

Experimental Example

In the process of separating, purifying and recovering methyl-2-pyroleadon (NMP) according to Examples and Comparative Examples, the energy consumption and the purity of the final product were evaluated by the following method, and the measurement results are shown in Table 4 below.

1) Total Energy Consumption (kW)

Based on the equivalent raw material input amount and the purity of the finally recovered product, the total amount of energy used in the purification process of Examples and Comparative Examples was measured in units of hours.

2) Purity of the Finally Recovered Product (%)

The purity (%) of NMP and water in the finally recovered product was determined based on equivalent raw material input amount.

TABLE 4

| | | Comparative Example 1 | Comparative Example 2 | Example 1 |
|---|---|---|---|---|
| Total energy consumption (kW) | | 1048.382 | 834.214* | 797.435 |
| Purity of recovered product | NMP (%) | 99 | 99 | 99 |
| | water (%) | 99 | 99 | 99 |
| | Extraction solvent in NMP (%) | — | 0.2 | — |

*Perform additional distillation to remove residual extraction solvent in NMP

As shown in Table 4, Example 1 according to the present invention was capable of effectively reducing the energy consumption required for NMP recovery relative to the total amount of energy used as compared with Comparative Examples 1 and 2.

On the other hand, as Comparative Example 1 was a method for recovering NMP in waste liquid after polymerization of most polyphenylene sulfides, which used a distillation process, there was a disadvantage in that energy consumption was high, and apparatus costs and operating costs was high.

In addition, in the case of Comparative Example 2, another extraction column and distillation column were required for introducing an extraction process as compared with Example 1. Further, the method was not often used in the NMP recovery process because of residual extraction solvent or the like.

Explanation of Symbols

1: waste liquid input stream
2: stripping section
3: transfer line of stripping section and compressor
4: compressor
5: line for transferring the column top stream from the stripping section via compressor to the rectifying section
6: rectifying section
7: transfer line of stripping section and heat exchanger
8: heat exchanger
9: transfer line of rectifying section and heat exchanger
10: reboiler
11: NMP passed through reboiler
12: condenser
13: water passed through condenser
14: valve
15: mixed liquid input stream of distillation column
16: overhead stream of distillation column
17: bottom stream of distillation column
18: condenser of distillation column
19: reboiler of distillation column
20: mixed liquid input stream of extraction column
21: extraction solvent input stream of extraction column
22: bottom stream of extraction column
23: extract input stream of distillation column
24: overhead stream of distillation column
25: bottom stream of distillation column
26: condenser of distillation column
27: reboiler of distillation column

The invention claimed is:

1. A method for recovering amide-based compounds comprising:
    collecting a waste liquid containing water and amide-based compounds into a storage tank;

distilling the waste liquid from a stripping section, separating a vapor phase mixture containing water and amide-based compounds which is vaporized at an upper part of the stripping section, and separating a liquid phase mixture containing amide-based compounds which is not vaporized at a lower part of the stripping section;

conducting distillation by transferring the vaporized vapor phase mixture containing water and amide-based compounds separated from the upper part of the stripping section to a rectifying section;

circulating heat generated in the distillation process of the stripping section and the rectifying section using a heat exchanger;

recirculating the vaporized vapor phase mixture containing water and amide-based compounds in the rectifying section, flowing the vaporized water to an upper part of the rectifying section, and flowing the amide compound liquefied by recirculation to a lower part of the rectifying section and then recycling to the stripping section; and flowing out the liquid phase mixture containing amide-based compounds from the stripping section to the lower part of the stripping section.

2. The method for recovering amide-based compounds according to claim 1, further comprising operating one or more heat exchangers between the stripping section and the rectifying section.

3. The method for recovering amide-based compounds according to claim 1, wherein the operating the one or more heat exchangers comprises operating one to three heat exchangers.

4. The method for recovering amide-based compounds according to claim 1, wherein the one or more heat exchangers are located between $2^{nd}$ and 7th stages of a distillation column in the stripping section, based on overhead of a distillation column of the rectifying section.

5. The method for recovering amide-based compounds according to claim 1, wherein the collecting a waste liquid step through the flowing out the liquid phase mixture containing amide-based compounds steps are performed continuously and repeatedly at least once.

6. The method for recovering amide-based compounds according to claim 1, further comprising operating a compressor connected and installed to the upper part of the stripping section, and operating a reboiler connected and installed to the lower part of the stripping section.

7. The method for recovering amide-based compounds according to claim 1, wherein the stripping section performs a distillation process by setting so that a theoretical stage number is the 5th stage to the 10th stage.

8. The method for recovering amide-based compounds according to claim 1, wherein the temperature of an overhead region of a distillation column in the stripping section is adjusted to 90° C. to 110° C., and the temperature of a bottom region of the distillation column in the stripping section is adjusted to 170° C. to 190° C.

9. The method for recovering amide-based compounds according to claim 1, wherein the temperature of a top region of a distillation column of the rectifying section is adjusted to 125° C. to 145° C., and the temperature of a bottom region of the distillation column in the rectifying section is adjusted to 125° C. to 145° C.

10. The method for recovering amide-based compounds according to claim 1, wherein the rectifying section performs a distillation process by setting so that a theoretical stage number is the 6th stage to the 10th stage.

11. The method for recovering amide-based compounds according to claim 1, wherein the amide-based compound is one or more selected from the group consisting of N,N-dimethylformamide, N,N-dimethylacetamide, N-methyl-2-pyrrolidone (NMP), N-cyclohexyl-2-pyrrolidone, N-methyl-ε-caprolactam, 1,3-dialkyl-2-imidazolidinone, and tetramethyl urea.

12. The method for recovering amide-based compounds according to claim 1, wherein the waste liquid is a liquid from which fine powders of inorganic salt and polyarylene sulfide are removed from a reaction mixture in a production process of polyarylene sulfide through a pretreatment process using a filter.

13. The method for recovering amide-based compounds according to claim 1, wherein the waste liquid further includes an alkali metal halide, a dihalogenated aromatic compound, an alkali metal sulfide and a polyarylene sulfide.

* * * * *